(12) United States Patent
Kim

(10) Patent No.: US 10,185,724 B2
(45) Date of Patent: Jan. 22, 2019

(54) METHOD FOR SORTING MEDIA CONTENT AND ELECTRONIC DEVICE IMPLEMENTING SAME

(71) Applicant: Samsung Electronics Co., Ltd., Suwon-si, Gyeonggi-do (KR)

(72) Inventor: Seunghwan Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 14/673,177

(22) Filed: Mar. 30, 2015

(65) Prior Publication Data
US 2015/0293943 A1 Oct. 15, 2015

(30) Foreign Application Priority Data
Apr. 9, 2014 (KR) .................. 10-2014-0042272

(51) Int. Cl.
*G06F 17/30* (2006.01)
(52) U.S. Cl.
CPC .... *G06F 17/30268* (2013.01); *G06F 17/3082* (2013.01); *G06F 17/30265* (2013.01)
(58) Field of Classification Search
CPC ......... G06F 17/30268; G06F 17/30271; G06F 17/30274; G06F 17/30277; G06F 17/3028; G06F 17/3071; G06F 17/30713; G06F 17/30716; G06F 17/3082; G06F 7/24; G06F 17/30265
USPC ....... 707/737, 738, 740, 741, 752, 753, 754, 707/755, 756, 758, 771, 805, E17.009, 707/999.107; 715/738
See application file for complete search history.

(56) References Cited

U.S. PATENT DOCUMENTS

| | | | |
|---|---|---|---|
| 5,761,655 A * | 6/1998 | Hoffman | G06F 17/3025 |
| 6,813,618 B1 * | 11/2004 | Loui | G06F 17/30256 |
| 6,970,859 B1 * | 11/2005 | Brechner | G06F 17/30017 |
| 7,020,848 B2 * | 3/2006 | Rosenzweig | G06F 17/30265 707/E17.026 |
| 7,032,182 B2 * | 4/2006 | Prabhu | G06F 17/30017 707/E17.009 |
| 8,094,948 B2 | 1/2012 | Jain et al. | |
| 2005/0114325 A1 | 5/2005 | Liu et al. | |
| 2005/0120055 A1 * | 6/2005 | Kawaguchi | G06F 17/3028 |
| 2010/0185627 A1 * | 7/2010 | Se | G06F 17/3002 707/752 |
| 2011/0125755 A1 * | 5/2011 | Kaila | G06F 17/30274 707/740 |
| 2011/0184950 A1 * | 7/2011 | Skaff | G06F 17/30265 707/737 |
| 2011/0225156 A1 * | 9/2011 | Pavlik | G06F 17/30038 707/737 |
| 2012/0150881 A1 * | 6/2012 | Cho | G06F 17/3002 707/755 |

(Continued)

FOREIGN PATENT DOCUMENTS

KR 10-1135222 B1 4/2012
KR 10-1252843 B1 4/2013

*Primary Examiner* — Greta L Robinson
(74) *Attorney, Agent, or Firm* — Jefferson IP Law, LLP

(57) ABSTRACT

A method of sorting a media content is provided. The method includes receiving at least one search word, extracting at least one media content based on the received search word, identifying a user's selection for the extracted media content, generating a group, and including the at least one media content in the group based on the identified user's selection.

19 Claims, 10 Drawing Sheets

(56) References Cited

U.S. PATENT DOCUMENTS

2013/0198176 A1\* 8/2013 Kim ................ G06F 17/30265
  707/724

\* cited by examiner

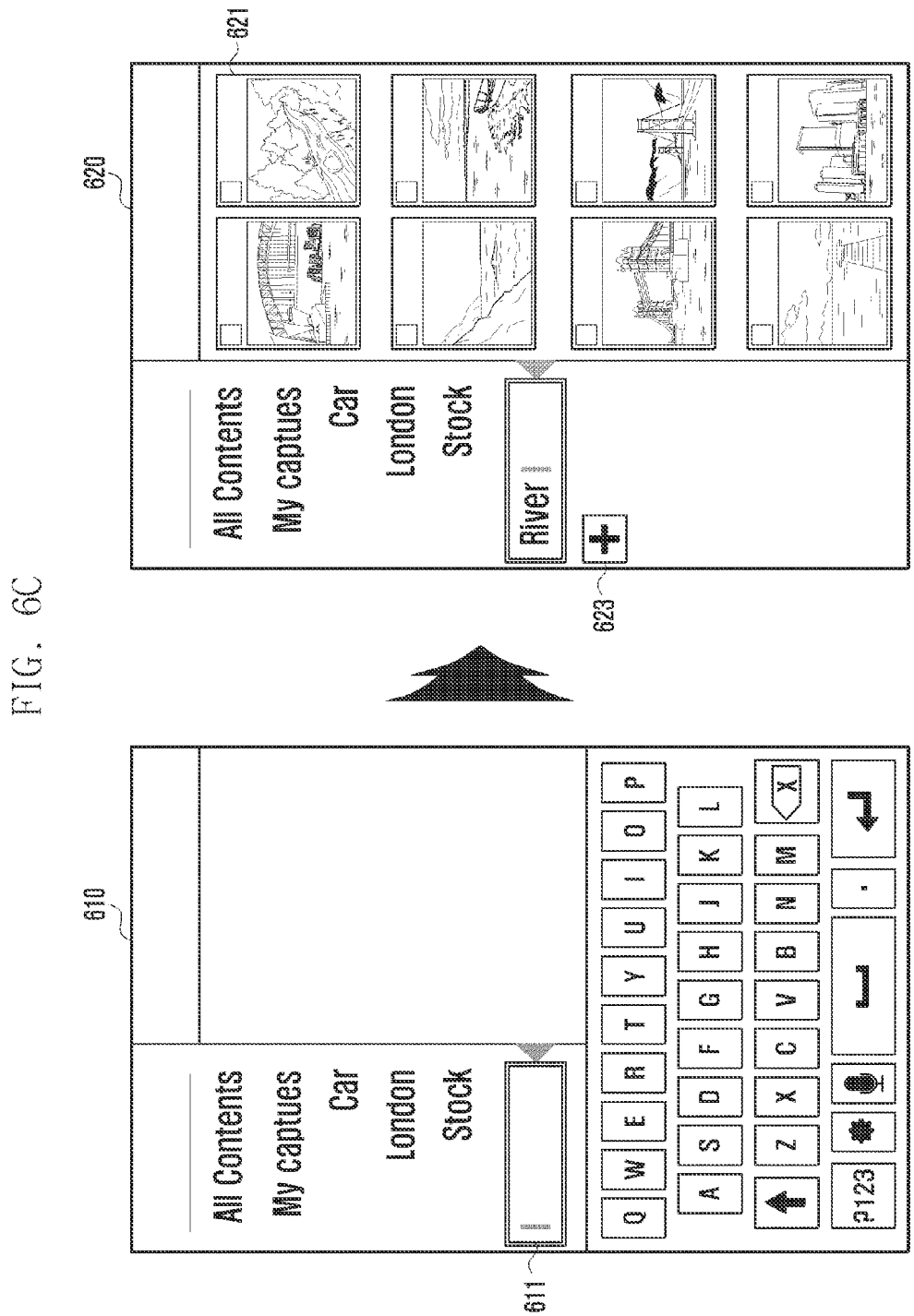

METHOD FOR SORTING MEDIA CONTENT AND ELECTRONIC DEVICE IMPLEMENTING SAME

CROSS-REFERENCE TO RELATED APPLICATION(S)

This application claims the benefit under 35 U.S.C. § 119(a) of a Korean patent application filed on Apr. 9, 2014 in the Korean Intellectual Property Office and assigned Serial number 10-2014-0042272, the entire disclosure of which is hereby incorporated by reference.

TECHNICAL FIELD

The present disclosure relates to a method for sorting a media content according to a user's intention.

BACKGROUND

With the generalization of digital cameras, a user can frequently photograph a picture and a video during his/her daily life. A digital camera can photograph a picture and a video and store the photographed picture and the photographed video in a storage device (e.g., a memory) in the form of a file. With the development of technology, the capacity of a storage device embedded in a digital camera may have been increased more and more. Further, since the digital camera stores the picture and the video, the digital camera can store a larger amount of pictures and videos as the capacity of the storage device is increased. A media content (e.g., a picture file and a video file) accumulated in the form of files can be generally classified in order of date on which the media content has been photographed. When a user randomly classifies media contents stored in the electrode device, the user generates a specific folder to separately store the media contents. Here, the user can directly and individually select the media contents and move the selected media contents to the specific folder. When the number of picture files stored in the storage device is several hundreds or more, the user can identify, select, and classify the picture files one by one.

The above information is presented as background information only to assist with an understanding of the present disclosure. No determination has been made, and no assertion is made, as to whether any of the above might be applicable as prior art with regard to the present disclosure.

SUMMARY

A method of sorting a media content according to the related art may be a method of a user generating a group (e.g., a folder and a directory) and moving a media content, which is directly selected by a user, among all of the media contents, to the group. Since the user should identify and move media contents stored in the electronic device, the time and the effort consumed by the user may increase as the number of the stored media contents becomes larger. That is, the user directly identifies media contents and moves the directly-selected media contents to a desired group, thereby sorting the media contents according to the user's intention. According to the related art, various operations of "generating a user's classification intention, generating a group (e.g., a folder) or a collection (e.g., album), selecting a media content object to be moved to the corresponding group, and moving the selected media content object" may be required in order to sort media contents. Further, since a user should perform the above operation by himself/herself, user convenience may deteriorate. Further, when a specific media content among a plurality of media contents is selectively classified, a large amount of time should be consumed by a user, and the user may feel inconvenience.

Aspects of the present disclosure are to address at least the above-mentioned problems and/or disadvantages and to provide at least the advantages described below. Accordingly, an aspect of the present disclosure is to provide a method of sorting a media content. The method can, when an image is photographed or a media content is downloaded, analyze the corresponding media content and include meta data illustrated in the media contents, in the media content. Accordingly, a user can sort a desired media content among the media content based on the meta data.

In accordance with an aspect of the present disclosure, a method of sorting a media content is provided. The method includes receiving at least one search word, extracting at least one media content based on the received search word, identifying a user's selection for the extracted media content, generating a group, and including the at least one media content in the group based on the identified user's selection.

A method and an electronic device for sorting a media content according to various embodiments of the present disclosure can automatize an operation of identifying and sorting a media content, thereby improving user's convenience. Here, the operation of sorting a media content may be an operation of sorting a media content according to not randomness but a user's intention. For example, the electronic device can sort a media content according to a search word input by a user based on meta data included in the media content. Further, the electronic device can generate a group (a folder) and move the sorted media content to the group. Accordingly, a user can save a time for sorting a media content and thereby user's convenience can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6C and 6D are views illustrating methods for selecting a media content and classifying the media content into a group based on a plurality of search words according to various embodiments of the present disclosure.

Throughout the drawings, it should be noted that like reference numbers are used to depict the same or similar elements, features, and structures.

DETAILED DESCRIPTION

Figure 1:
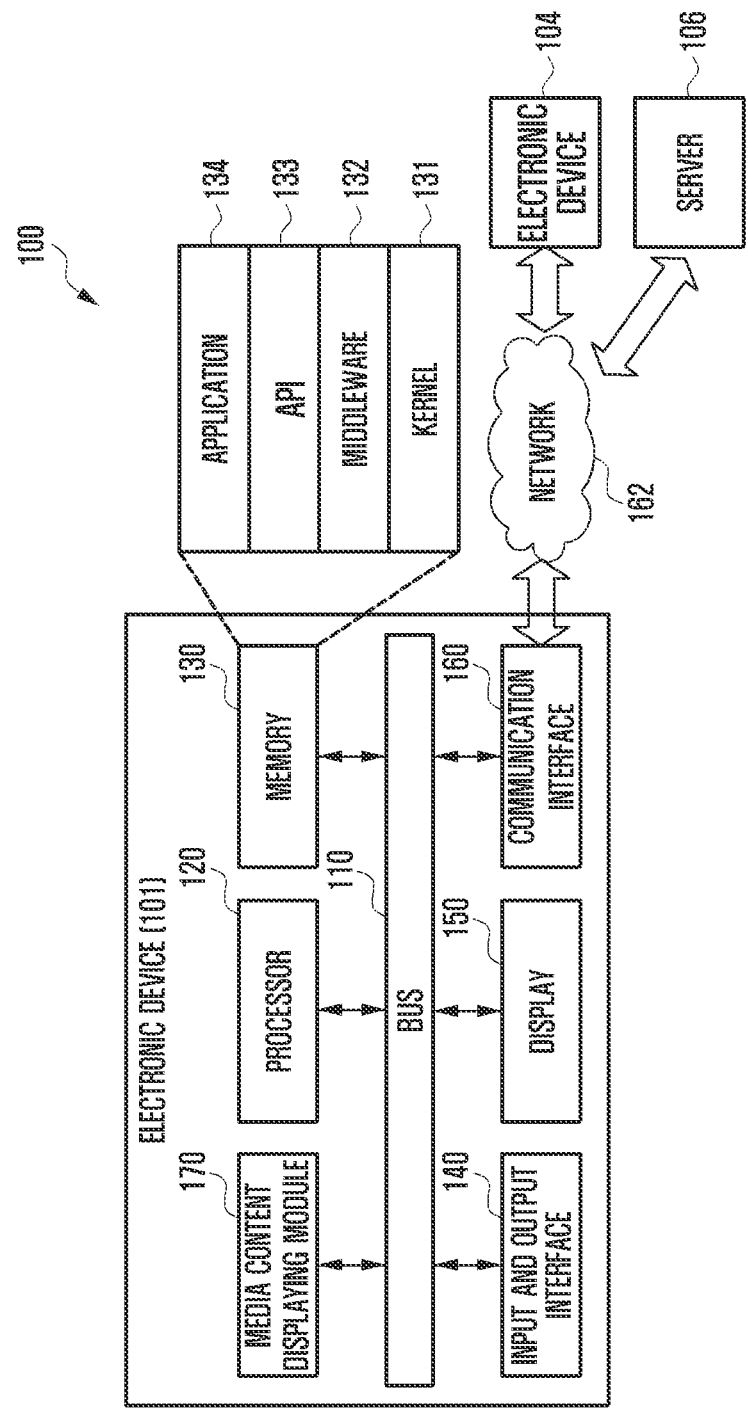
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that the expressions "comprises" and "may comprise" are used to specify presence of disclosed function, operation, component, etc. but do not preclude the presence of one or more functions, operations, components, etc. It will be further understood that the terms "comprises" and/or "has" when used in this specification, specify the presence of stated feature, number, operation, component, element, or a combination thereof but do not preclude the presence or addition of one or more other features, numbers, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the present disclosure.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g., head-mounted device (HMD) such as electronic glasses, electronic clothing, electronic bracelet, electronic necklace, electronic appcessory, electronic tattoo, smartwatch, etc.)

According to an embodiment of the present disclosure, the electronic device may be one of smart home appliances having operation support function. Examples of the smart electronic appliance as an electronic device may include television (TV), Digital Video Disk (DVD) player, audio player, refrigerator, air-conditioner, vacuum cleaner, electronic oven, microwave oven, laundry machine, air cleaner, set-top box, TV box (e.g., Samsung HomeSync™, Apple TV™, and Google TV™), game console, electronic dictionary, electronic key, camcorder, and electronic frame, etc.

According to an embodiment of the present disclosure, examples of the electronic device may include medical device (e.g., Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g., maritime navigation device and gyro compass), aviation electronic device (avionics), security device, vehicle head unit, industrial or home robot, Automatic Teller's Machine (ATM) of financial institution, Point of Sales (POS), etc.

According to an embodiment of the present disclosure, examples of the electronic device may include furniture and building/structure having a communication function, electronic board, electronic signature receiving device, projector, and metering device (e.g., water, electric, gas, and electric wave metering devices). According to various embodiments of the present disclosure, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments of the present disclosure with reference to accompanying drawings hereinafter. The term 'user' used in various embodiments of the present disclosure may denote a person or a device (e.g., artificial intelligent electronic device) using the electronic device.

FIG. 1 illustrates a network environment 100 including an electronic device 101 according to various embodiments of the present disclosure.

Referring to FIG. 1, the electronic device 101 may include a bus 110, a processor 120, a memory 130, an input/output interface 140, a display 150, a communication interface 160, and a media content sorting module 170.

The bus 110 may be a circuit for connecting the aforementioned elements to each other and transmitting communication (e.g., a control message) between the aforementioned elements.

For example, the processor 120 may receive an instruction from the aforementioned other elements (e.g., the memory 130, the input/output interface 140, the display 150, the communication interface 160, the media content sorting module 170, etc.) through the bus 110, decipher the received instruction, and perform calculation or data processing according to the deciphered instruction.

The memory 130 may store the command or data received from the processor 120 or other components (e.g., input/output interface 140, display 150, communication interface 160, media content sorting module 170, etc.) or generated by the processor 120 or other components. The memory 130 may store program modules including kernel 131, middleware 132, Application Programming Interface (API) 133, applications 134, etc. Each programming module may be implemented as software, firmware, hardware, and any combination thereof.

The kernel 131 may control or manage the system resources (e.g., bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middleware 132 may execute control of the task requests from the applications 134 in such a way of assigning priority for use of the system resource (e.g., bus 110, processor 120, and memory 130) of the electronic device to at least one of the applications 134.

The API 133 is the interface for the applications 134 to control the function provided by the kernel 131 or the middleware 132 and may include at least one interface or function (e.g., command) for file control, window control, image control, or text control.

According to various embodiments of the present disclosure, the application 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternatively, the application 134 may include an application related to an information exchange between the electronic device 101 and an external electronic device (e.g., an electronic device 104). The application related to the information exchange may include, for example, a notification relay application for transferring particular information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, a health management application, an environmental information application, and the like). Additionally or alternatively, the notification relay application may receive notification information from, for example, the external electronic device (e.g., the electronic device 104) and provide the received notification information to a user. For example, the device management application may manage (e.g., install, delete, or update) functions for at least a part of the external electronic device (e.g., the electronic device 104) communicating with the electronic device 101 (e.g., turning on/off the external electronic device itself (or some elements thereof) or adjusting brightness (or resolution) of a display), applications operating in the external electronic device, or services (e.g., a telephone call service or a message service) provided from the external electronic device.

According to various embodiments of the present disclosure, the application 134 may include an application designated according to an attribute (e.g., a type of the electrode device) of the external electronic device (e.g., the electronic device 104). For example, when the external electronic device is an MP3 player, the application 134 may include an application related to the reproduction of music. Similarly, in the case where the external electronic device is a mobile medical appliance, the application 134 may include an application related to health care. According to an embodiment of the present disclosure, the application 134 may include at least one of an application designated to the electronic device 101 and an application received from the external electronic device (e.g., a server 106 or the electronic device 104).

The input/output interface 140 may transfer instructions or data input from a user through an input/output device (e.g., a sensor, a keyboard, or a touch screen) to, for example, the processor 120, the memory 130, the communication interface 160, or the media content sorting module 170 through the bus 110. For example, the input/output interface 140 may provide, to the processor 120, data for a user's touch input through the touch screen. Further, the input/output interface 140 may output, for example, an instruction or data received through the bus 110 from the processor 120, the memory 130, the communication interface 160, and the media content sorting module 170, through an input/output device (e.g., a speaker or display). For example, the input/output interface 140 may output voice data processed through the processor 120 to the user through the speaker.

The display 150 may display various pieces of information (e.g., multimedia data or text data) to a user.

The communication interface 160 may connect communication between the electronic device 101 and the external electronic device (e.g., the electronic device 104 or the server 106). For example, the communication interface 160 communicates with the external device (e.g., the electronic device 104 or the server 106) while being connected to a network 162 through wireless communication or wired communication. The wireless communication may include at least one of, for example, Wi-Fi (Wireless Fidelity), Bluetooth (BT), Near Field Communication (NFC), Global Positioning System (GPS) and cellular communication (e.g., Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a communication network. The communication network may include at least one of a computer network, the Internet, the Internet of things, and a telephone network. According to an embodiment of the present disclosure, a protocol (e.g., a transport layer protocol, data link layer protocol, or a physical layer protocol) for communication between the electronic device 101 and the external device may be supported by at least one of the application 134, the API 133, the middleware 132, the kernel 131, and the communication interface 160.

Figure 2:
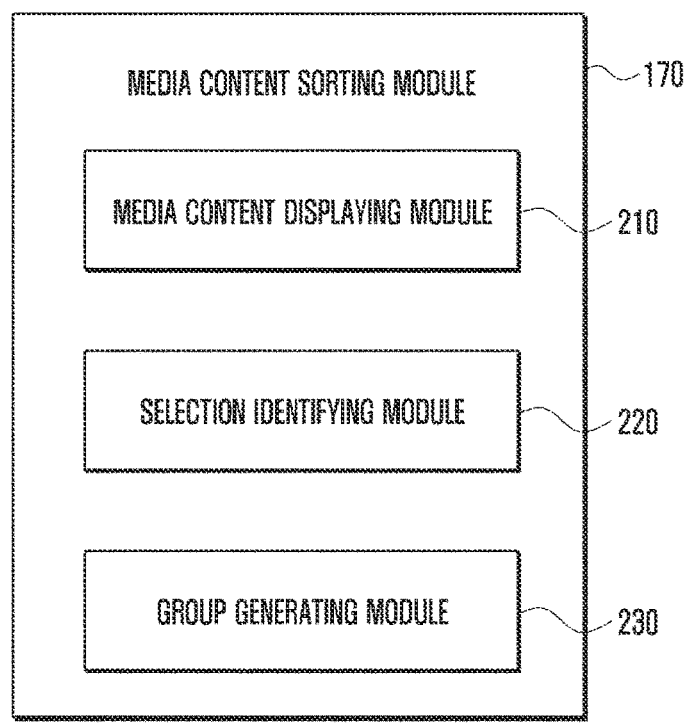
FIG. 2 is a block diagram illustrating a media content sorting module of an electronic device according to various embodiments of the present disclosure.

FIG. 2 is a block diagram illustrating a media content sorting module 170 of an electronic device (e.g., the electronic device 101) according to various embodiments of the present disclosure.

Referring to FIG. 2, the media content sorting module 170 may include a media content display module 210, a selection identifying module 220, a group generating module 230, and an interworking control module 240.

The media content display module 210 can, for example, display at least one of media contents stored in the memory 130 of the electronic device 101 through the display 150. According to an embodiment of the present disclosure, the media content display module 210 can display media contents received from the external device (e.g., the electronic device 104 or the server 106) through the display 150 of the electronic device 101. The media content display module 210 can display the media contents in the form of a thumbnail or a list.

The selection identifying module 220 can, for example, identify a user input for the media contents displayed on the display 150 through the display module 210. Here, when the display 150 is a touch screen, the user input may be a touch input. The selection identifying module 220 can identify a media content selected by a user based on the user input.

The group generating module 230 can, for example, generate a group for classifying media contents identified through the selection identifying module 220. Here, the generation of the group may correspond to an operation of generating an internal directory (e.g., a folder) of the electronic device 101. Further, the group may reference a tag. The group generating module 230 can receive, from a user, an input of a name of the group to generate the group.

The media content sorting module 170 can, for example, control the media content display module 210, the selection identifying module 220, and the group generating module 230, which are described above, in order to sort media contents. The media content sorting module 170 can display at least one of media contents through the media content display module 210 and display a selection input window to select the corresponding media contents. Further, the media content sorting module 170 can identify a user input for the selection input window through the selection identifying module 220. Further, the media content sorting module 170 can generate a group through a group generating module 230 and move a media content, for which a user input is identified, to the generated group.

The media content sorting module 170 may be a module which can control the media content display module 210, the selection identifying module 220, and the group generating module 230, which are described above, so as to sort media contents.

Figure 3:
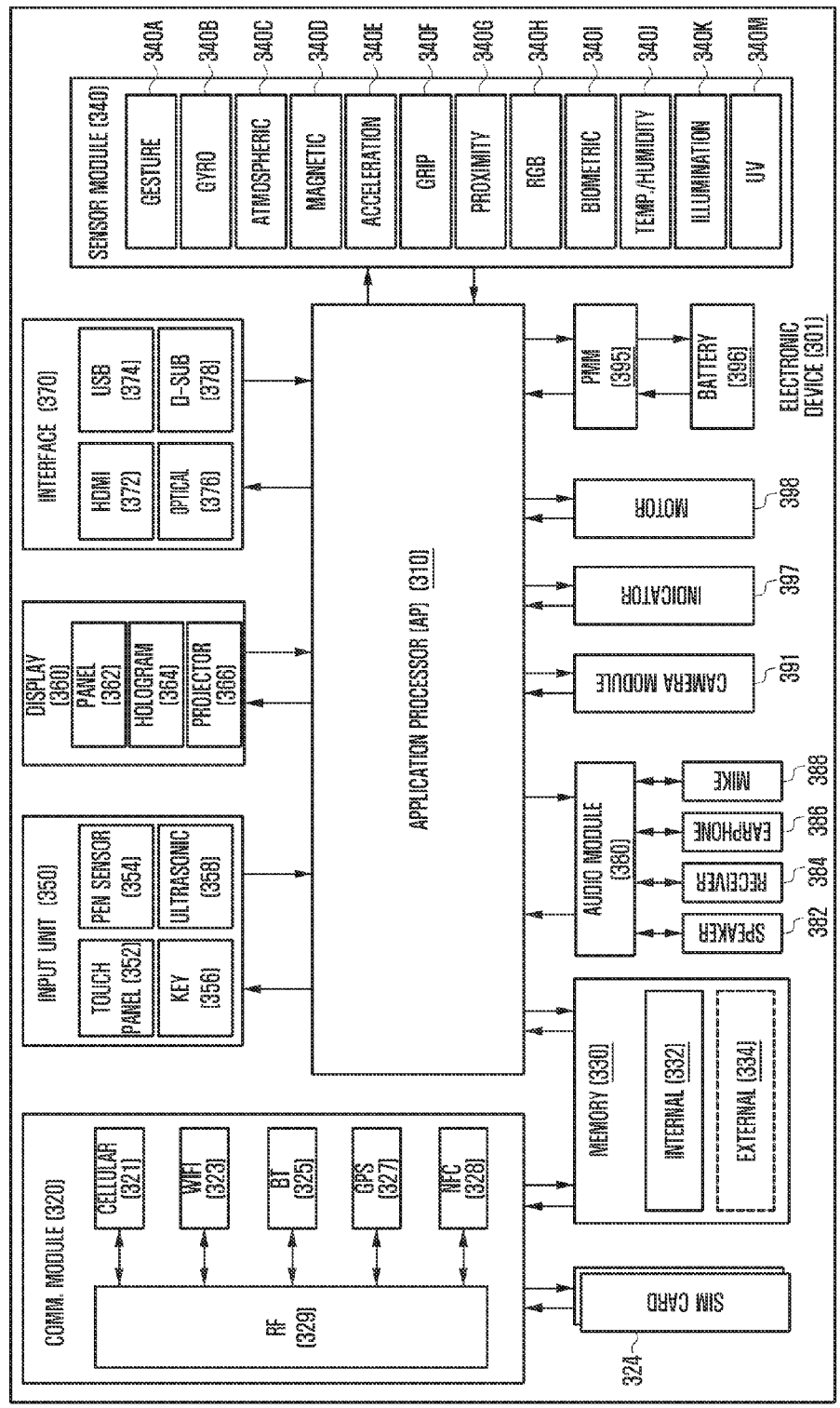
FIG. 3 is a block diagram illustrating an electronic device according to various embodiments of the present disclosure.

FIG. 3 is a block diagram illustrating a configuration of the electronic device according to various embodiments of the present disclosure. The electronic device 301 may be of the whole or a part of the electronic device 101.

Referring to FIG. 3, the electronic device 301 may include an Application Processor (AP) 310, a communication module 320, a Subscriber Identity Module (SIM) card 324, a memory 330, a sensor module 340, an input device 350, a display 360, an interface 370, an audio module 380, a camera module 391, a power management module 395, a battery 396, an indicator 397, and a motor 398.

The AP 310 may operate an Operating System (OS) and/or application programs to control a plurality of hardware and/or software components connected to the AP 310 and perform data-processing and operations on multimedia data. For example, the AP 310 may be implemented in the form of System on Chip (SoC). According to an embodiment of the present disclosure, the AP 310 may include a Graphic Processing Unit (GPU) (not shown).

The communication module 320 (e.g., communication interface 160) may perform data communication with other electronic devices (e.g., electronic device 104 and server 106) through a network. According to an embodiment of the present disclosure, the communication module 320 may include a cellular module 321, a Wi-Fi module 323, a BT module 325, a GPS module 327, an NFC module 328, and a Radio Frequency (RF) module 329.

The cellular module 321 is responsible for voice and video communication, text messaging, and Internet access services through a communication network (e.g., LTE, LTE-A, CDMA, WCDMA, UMTS, WiBro, and GSM networks). The cellular module 321 may perform identification and authentication of electronic devices in the communication network using the SIM card 324. According to an embodiment of the present disclosure, the cellular module 321 may perform at least one of the functions of the AP 310. For example, the cellular module 321 may perform at least a part of the multimedia control function.

According to an embodiment of the present disclosure, the cellular module 321 may include a Communication Processor (CP). The cellular module 321 may be implemented in the form of SoC. Although the cellular module 321 (e.g., CP), the memory 330, and the power management module 395 are depicted as independent components separated from the AP 310, the present disclosure is not limited thereto but may be embodied in a way that the AP includes at least one of the components (e.g., cellular module 321).

According to an embodiment of the present disclosure, each of the AP 310 and the cellular module 321 (e.g., CP) may load a command or data received from at least one of the components on a non-volatile or volatile memory and process the command or data. The AP 310 or the cellular module 321 may store the data received from other components or generated by at least one of other components in the non-volatile memory.

Each of the Wi-Fi module 323, the BT module 325, the GPS module 327, and the NFC module 328 may include a processor for processing the data it transmits/receives. Although the cellular module 321, the Wi-Fi module 323, the BT module 325, the GPS module 327, and the NFC module 328 are depicted as independent blocks; at least two of them (e.g., CP corresponding to the cellular module 321 and Wi-Fi processor corresponding to the Wi-Fi module 323) may be integrated in the form of SoC.

The RF module 329 is responsible for data communication, e.g., transmitting/receiving RF signals. Although not depicted, the RF module 329 may include a transceiver, a Power Amp Module (PAM), a frequency filter, and a Low Noise Amplifier (LNA). The RF module 329 also may include the elements for transmitting/receiving electric wave in free space, e.g., conductor or conductive wire. Although FIG. 3 is directed to the case where the Wi-Fi module 323, the BT module 325, the GPS module 327, and the NFC module 328 are sharing the RF module 329, the present disclosure is not limited thereto but may be embodied in a way that at least one of the Wi-Fi module 323, the BT module 325, the GPS module 327, and the NFC module 328 transmits/receives RF signals an independent RF module.

The SIM card 324 may be designed so as to be inserted into a slot formed at a predetermined position of the electronic device. The SIM card 324 may store unique identity information (e.g., Integrated Circuit Card Identifier (IC-CID)) or subscriber information (e.g., International Mobile Subscriber Identity (IMSI)).

The memory 330 (e.g., memory 130) may include at least one of the internal memory 332 and an external memory 334. The internal memory 332 may include at least one of a volatile memory (e.g., Dynamic Random Access Memory (DRAM), Static RAM (SRAM), Synchronous DRAM (SDRAM) or a non-volatile memory (e.g., One Time Programmable Read Only Memory (OTPROM), PROM, Erasable and Programmable ROM (EPROM), Electrically Erasable and Programmable ROM (EEPROM), mask ROM, flash ROM, Not And (NAND) flash memory, and Not Or (NOR) flash memory).

According to an embodiment of the present disclosure, the internal memory 332 may be a Solid State Drive (SSD). The external memory 334 may be a flash drive such as Compact Flash (CF), Secure Digital (SD), micro-SD, Mini-SD, extreme Digital (xD), and Memory Stick. The external memory 334 may be connected to the electronic device 301 through various interfaces functionally. According to an embodiment of the present disclosure, the electronic device 301 may include a storage device (or storage medium) such as hard drive.

The sensor module 340 may measure physical quantity or check the operation status of the electronic device 301 and convert the measured or checked information to an electric signal. The sensor module 340 may include at least one of gesture sensor 340A, Gyro sensor 340B, barometric sensor 340C, magnetic sensor 340D, acceleration sensor 340E, grip sensor 340F, proximity sensor 340G, color sensor 340H (e.g., Red, Green, Blue (RGB) sensor), bio sensor 340I, temperature/humidity sensor 340J, illuminance sensor 340K, and Ultra Violet (UV) sensor 340M. Additionally or alternatively, the sensor module 340 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 340 may further include a control circuit for controlling at least one of the sensors included therein.

The input device 350 may include a touch panel 352, a (digital) pen sensor 354, keys 356, and an ultrasonic input device 358. The touch panel 352 may be one of capacitive, resistive, infrared, microwave type touch panel. The touch panel 352 may include a control circuit. In the case of the capacitive type touch panel, it is possible to detect physical contact or approximation. The touch panel 352 may further include a tactile layer. In this case, the touch panel 352 may provide the user with haptic reaction.

The (digital) pen sensor 354 may be implemented with a sheet with the same or similar way as touch input of the user or a separate recognition sheet. The keys 356 may include physical buttons, optical key, and keypad. The ultrasonic input device 358 is a device capable of checking data by detecting sound wave through a microphone 388 and may be implemented for wireless recognition. According to an embodiment of the present disclosure, the electronic device 301 may receive the user input made by means of an external device (e.g., computer or server) connected through the communication module 320.

The display 360 (e.g., display 150) may include a panel 362, a hologram device 364, and a projector 366. The panel 362 may be a Liquid Crystal Display (LCD) panel or an Active Matrix Organic Light Emitting Diodes (AMOLED) panel. The panel 362 may be implemented so as to be flexible, transparent, and/or wearable. The panel 362 may be implemented as a module integrated with the touch panel 352. The hologram device 364 may present 3-dimensional image in the air using interference of light. The projector 366 may project an image to a screen. The screen may be placed inside or outside the electronic device. According to an embodiment of the present disclosure, the display 360 may include a control circuit for controlling the panel 362, the hologram device 364, and the projector 366.

The interface 370 may include an HDMI 372, a USB 374, an optical interface 376, and a D-subminiature (D-sub) 378. The interface 370 may include the communication interface 160 as shown in FIG. 1. Additionally or alternatively, the interface 370 may include a Mobile High-definition Link (MHL) interface, an SD/MultiMedia Card (MMC) card interface, and infrared Data Association (irDA) standard interface.

The audio module 380 may convert sound to electric signal and vice versa. At least a part of the audio module 380 may be included in the input/output interface 140 as shown in FIG. 1. The audio module 1280 may process the audio information input or output through the speaker 382, the receiver 384, the earphone 386, and the microphone 388.

The camera module 391 is a device capable of taking still and motion pictures and, according to an embodiment of the present disclosure, includes at least one image sensor (e.g., front and rear sensors), a lens (not shown), and Image Signal Processor (ISP) (not shown), and a flash (e.g., LED or xenon lamp) (not shown).

The power management module 395 may manage the power of the electronic device 301. Although not shown, the power management module 395 may include a Power Management Integrated Circuit (PMIC), a charger IC, a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment of the present disclosure, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 396, charging voltage, current, and temperature. The battery 396 may store or generate power and supply the stored or generated power to the electronic device 301. The battery 396 may include a rechargeable battery or a solar battery.

The indicator 397 may display operation status of the electronic device 301 or a part of the electronic device, booting status, messaging status, and charging status. The motor 398 may converts the electronic signal to mechanical vibration. Although not shown, the electronic device 301 may include a processing unit (e.g., GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

The electronic device according to various embodiments of the present disclosure includes: a display module for displaying a media content; a vocabulary analyzing module for analyzing a search word; an analysis module for detecting meta data based on the media content; and a control module functionally connected with the display module, the analysis module and the image analysis module, wherein the control module receives at least one search word, extracts at least one media content based on the at least one search word, identifies a user's selection for the at least one media content, generates a group, and includes the at least one media content in the group based on the user's selection.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to various embodiments of the present disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific IC (ASIC) chip, Field-Programmable Gate Arrays (FPGAs), and Programmable-Logic Device known or to be developed for certain operations.

Figure 4:
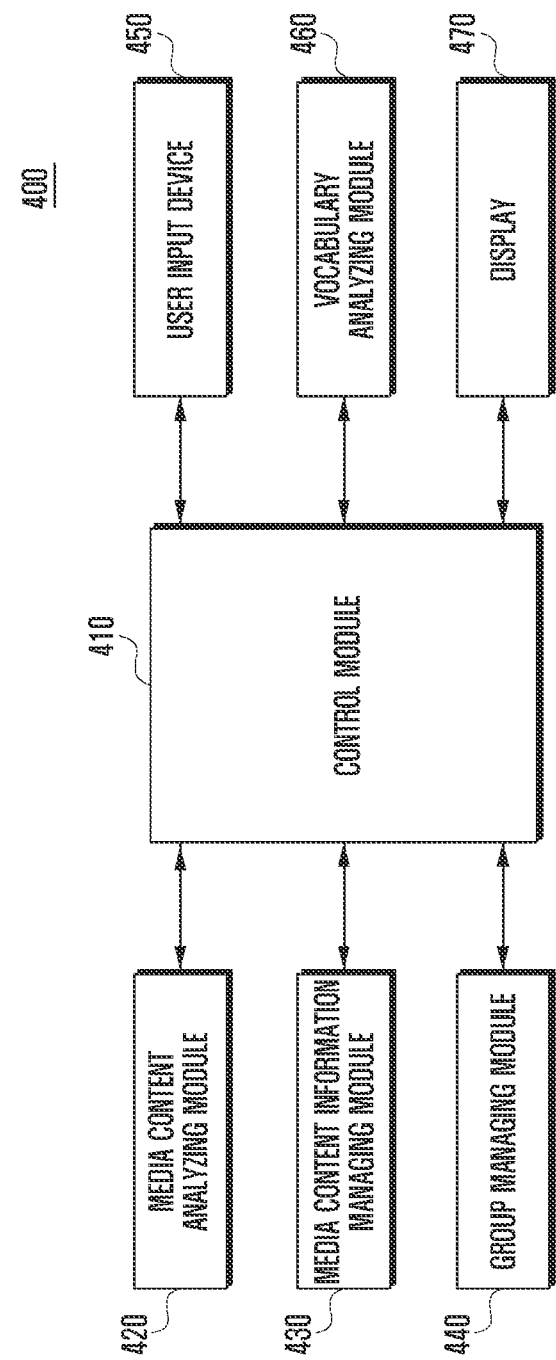
FIG. 4 illustrates a configuration module of an electronic device according to various embodiments of the present disclosure.

FIG. 4 illustrates a configuration module of an electronic device according to various embodiments of the present disclosure.

Referring to FIG. 4, an electronic device 400 may include a control module 410, a media content analyzing module 420, a media content information managing module 430, an group managing module 440, a user input device 450, a vocabulary analyzing module 460, and a display 470.

The control module 410 may be a processor 120 illustrated in FIG. 1 and can control modules of the aforementioned electronic device (e.g., the electronic device 101 in FIG. 1).

The media content analyzing module 420 can identify information on a basic attribute such as a photographing location and a photographing date of an image file among media contents stored in the electronic device 400. Here, the media contents may include an image file, a video file, a music file, etc. That is, the media content analyzing module 420 can identify various pieces of information for an image file including basic information (e.g., photographing location, date, weather, and temperature) through the image file. Here, the media content analyzing module 420 can identify a location at which an image file is photographed, using the GPS module 327 in FIG. 3. Further, the media content analyzing module 420 can identify a character displayed in the media content using an Optical Character Reader (OCR). The OCR, which is an optical character reader, can identify a character displayed in an image using light and convert a reflection ray therefor into an encoded electric signal. The OCR may be an application program (e.g., the application 134 in FIG. 1). Further, the media content analyzing module 420 can identify meta data corresponding to a person, a figure, an object, a brand, a color, a sculpture, etc. using a figure recognition program (e.g., Image Recognition Solution), and the meta data may be include in the media contents. For example, the meta data may include information on an object and an image generated based on the media contents. Here, the information on an object may be information on a person, a figure, an object, a brand, a sculpture, etc., and the information on an image may be information on a location, a color, and weather of the image. Further, when the media content is a music file, the media content analyzing module 420 may include meta data, of which lyrics, rhythm, harmony, etc. are analyzed, in the music file. Further, when the media content is a video file, the media content analyzing module 420 can identify lines or the name of an actor/actress, and use the identified lines or the identified name of an actor/actress as meta data.

The media content information managing module 430 can database and manage various pieces of meta data extracted by the media content analyzing module 420 together with index information of the corresponding media contents. For example, the media content information managing module 430 can manage the meta data extracted from the media contents while the media contents is include in the index information of the media contents.

The group managing module 440 can manage groups including media contents stored in the electronic device 400. That is, the group managing module 440 can perform operations of generating, deleting, and modifying a group (e.g., a folder and a directory). The group managing module 440 may be the application 134 in FIG. 1.

The user input device 450 may be the input/output interface 140 in FIG. 1. That is, the user input device 450 may include the input device 350 in FIG. 3 (e.g., the touch panel 352, the pen sensor 354, the key 356, and the ultrasonic wave input device 358). The control module 410 can make a control to perform an operation of each module based on a user input received through the user input device 450.

The vocabulary analyzing module 460 can analyze a character, which is input as a group name (e.g., a folder name) from a search window by a user, in a unit of morpheme, analyze a hierarchical structure of a word, and determine an associated vocabulary. For example, since "apple" is included in "fruit", when a user inputs "apple" on the search window, the control module 410 can extract media contents including information on "fruit" as well as media contents including information on "apple". In this way, the vocabulary analyzing module 460 can widely apply an extracted range of the media contents according to the hierarchical structure of a word.

The display 470 may be the display 150 in FIG. 1 or the display 360 in FIG. 3. The display 470 can display a User Interface (UI) of an application through the display 150 in FIG. 1 or the display 360 (e.g., a panel 362, a hologram device 364, and a projector 366) in FIG. 3. That is, the display module 470 can display media contents through the display 150 in FIG. 1 or the display 360 in FIG. 3.

In other words, the control module 410 can analyze media contents through the media content analyzing module 420. The control module 410 can analyze a media content to extract meta data based on the media content. The control module 410 can manage the media content including the meta data through the media content information managing module 430. At this time, the control module 410 can group the media content through the group managing module 440, thereby easily managing the media content. Further, the control module 410 can analyze a search word input through the user input device 450. The control module 410 can analyze a search word through the vocabulary analyzing module 460. Further, the control module 410 can output media contents sorted based on the analyzed search word, through the display 470. The control module 410 can manage media contents, which is selected according to a user's input, among the outputted media contents, into groups by classifying the media contents into groups.

Figure 5A:
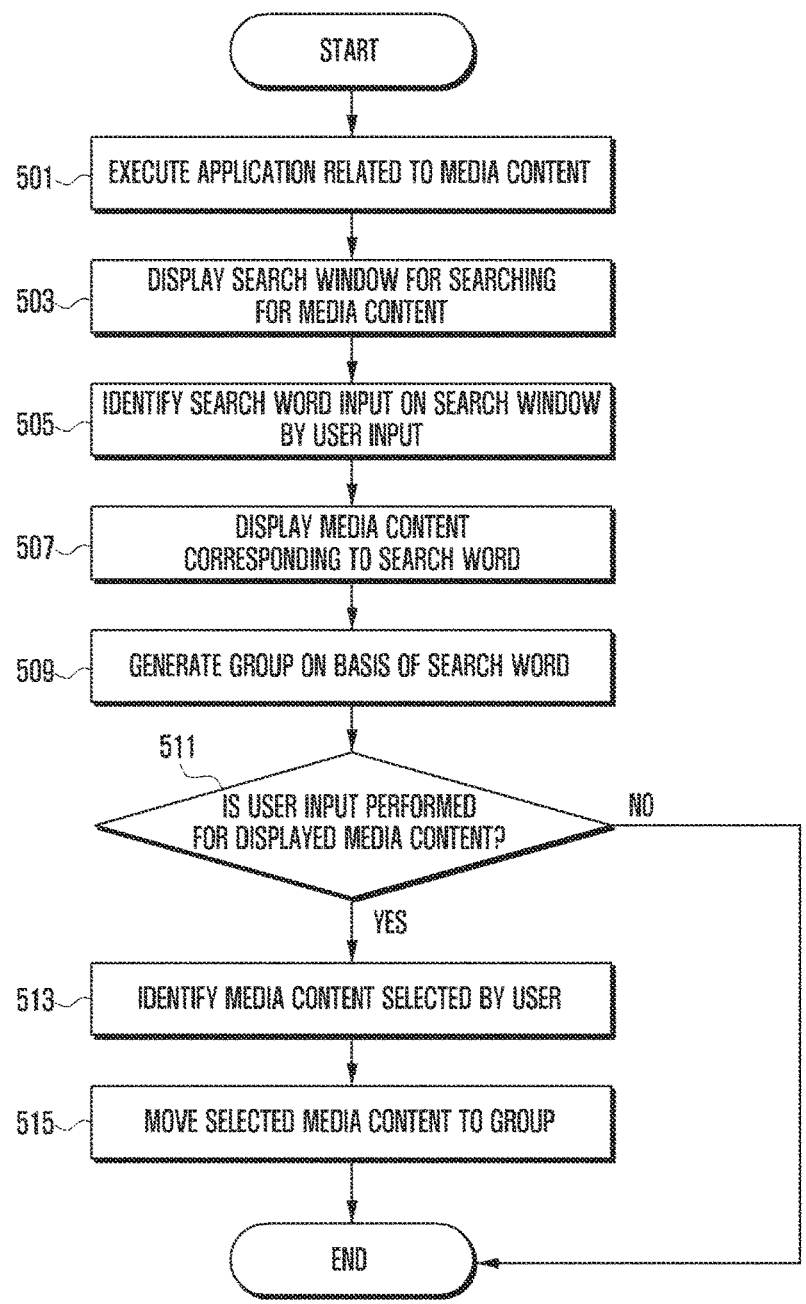
FIGS. 5A and 5B are flowcharts illustrating methods for selecting a media content and classifying the media content into a group according to various embodiments of the present disclosure.
Figure 5B:
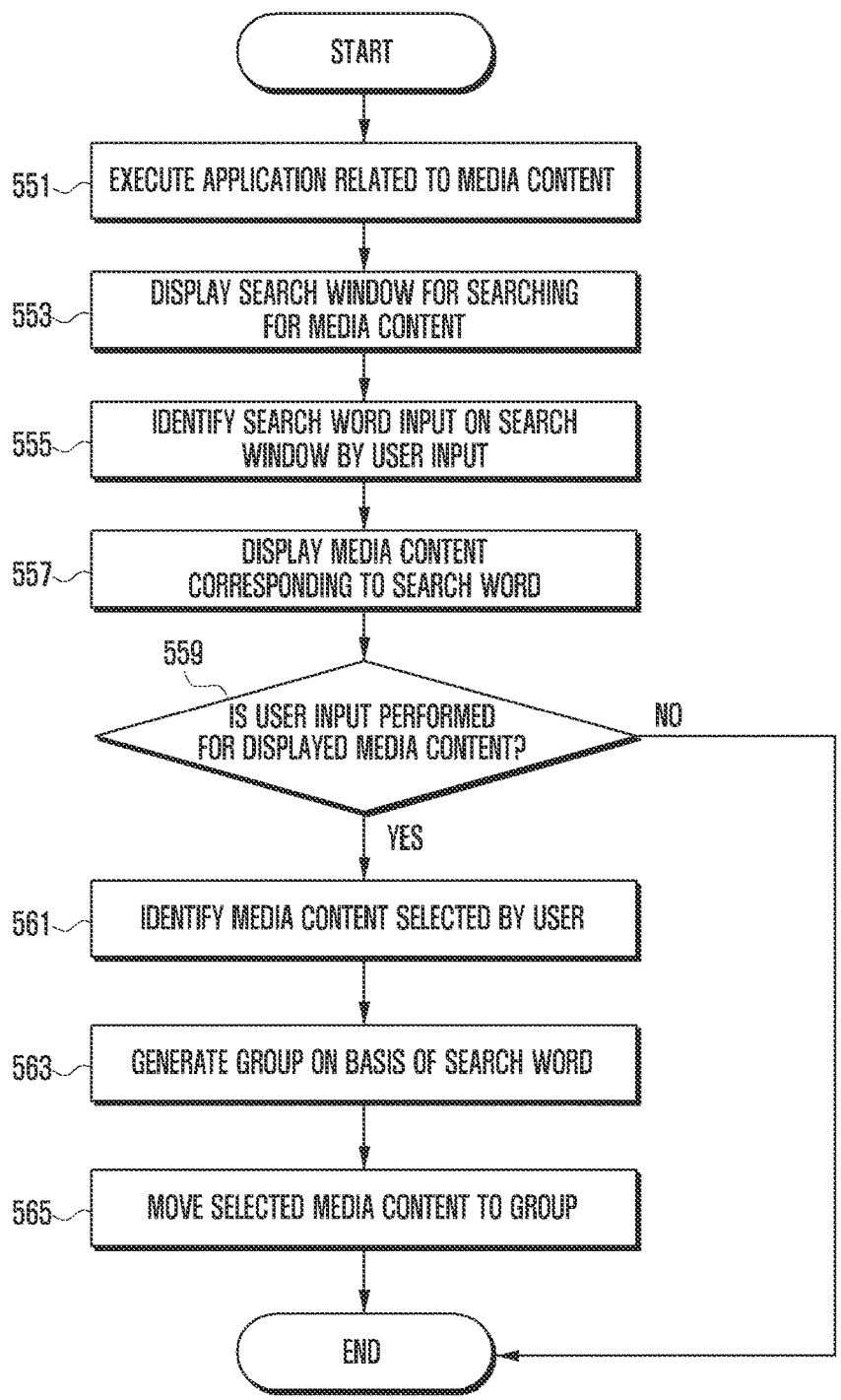

FIGS. 5A and 5B are flowcharts illustrating methods for selecting a media content and classifying the media content into a group according to various embodiments of the present disclosure.

Referring to FIG. 5A, in operation 501, the control module 410 can execute a media content related application (e.g., an application program). Here, the media content related application may be an application which outputs a media content stored in the electronic device, through the display 470. In operation 503, the control module 410 can display a search window for searching for a media content. For example, when the media content related application is executed, the search window may be output as the UI through the display 470. In operation 505, the control module 410 can identify a search word input on the search window by a user input. The control module 410 can search for a media content related to the search word input on the search window. Here, when the media content is photographed or downloaded, the control module 410 can include media content information analyzed through the media content analyzing module 420, in the media content. Accordingly, the control module 410 can search for a media content related to the search word through the media content information included in the media content. Further, the control module 410 can analyze a hierarchical structure of the search word input on the search window through the vocabulary analyzing module 460. Further, the control module 410 can search for the media content relating to the search word through the media content information managing module 430. For example, "fruit" is input as a search word, the control module 410 can analyze a hierarchical structure of the fruit to search for search words such as "apple," "banana," and "strawberry", which are classified as sub-elements of the fruit. Further, the control module 410 can also classify a media content including the word "fruit" as a media content relating to the search word. In this way, the control module 410 can widely apply an extraction range of the media content relating to the search word. In operation 507, the control module 410 can output the media content corresponding to the input search word through the display 470. That is, the control module 410 can extract a media content relating to the search word based on the input search word, and display the extracted media content through the display 470. The control module 410 does not configure an arbitrary standard such as a photographing date as a classification standard of a media content but configures a search word input according to a user's intention as the classification standard. Although not illustrated in FIGS. 5A and 5B, the control module 410 can additionally include other search words in addition to the input search word in the classification standard. For example, in operation 507, when the number of illustrated media contents is large, the control module 410 can configure an additional search word in order to classify the media contents in more detail. That is, the control module can firstly classify the media contents based on an initial search word and then secondly classify the firstly-classified media contents based on the additional search word. In operation 509, the control module 410 can generate a group based on the search words. That is, the control module 410 can generate a group named the search word. When secondly classifying the media contents based on the additional search word, the control module 410 can determine a name of a group including the additional search word. In operation 511, the control module 410 can identify whether a user input is performed for a media content displayed on the display 470. A user can select a media content which is to move the media content to the group. In operation 513, the control module 410 can identify the media content selected by the user. Further, in operation 515, the control module 410 can move the selected media content to the group. That is, the control module 410 can copy the media content to the group, or cut the media content and move the cut media content.

Referring to FIG. 5B, operations 551, 553, and 555 are identical to operations 501, 503, and 505 in FIG. 5A. Further, operations 557, 559, and 561 in FIG. 5B are identical to operations 509, 511, and 513 in FIG. 5A. In FIG. 5B, which is different from FIG. 5A, the control module 410 can identify a media content selected by a user, in operation 561, and can generate a group based on a search word, in operation 563. That is, FIG. 5B is different from FIG. 5A in terms of only a sequence of generating a group in a system. For example, in operation 561, the control module 410 can identify the media content selected by the user. In operation 563, the control module 410 can generate a group which is to move the media content. Here, the group may be named based on a search word input by a user. In operation 565, the control module 410 can move the selected media content to the group.

Figure 6A:
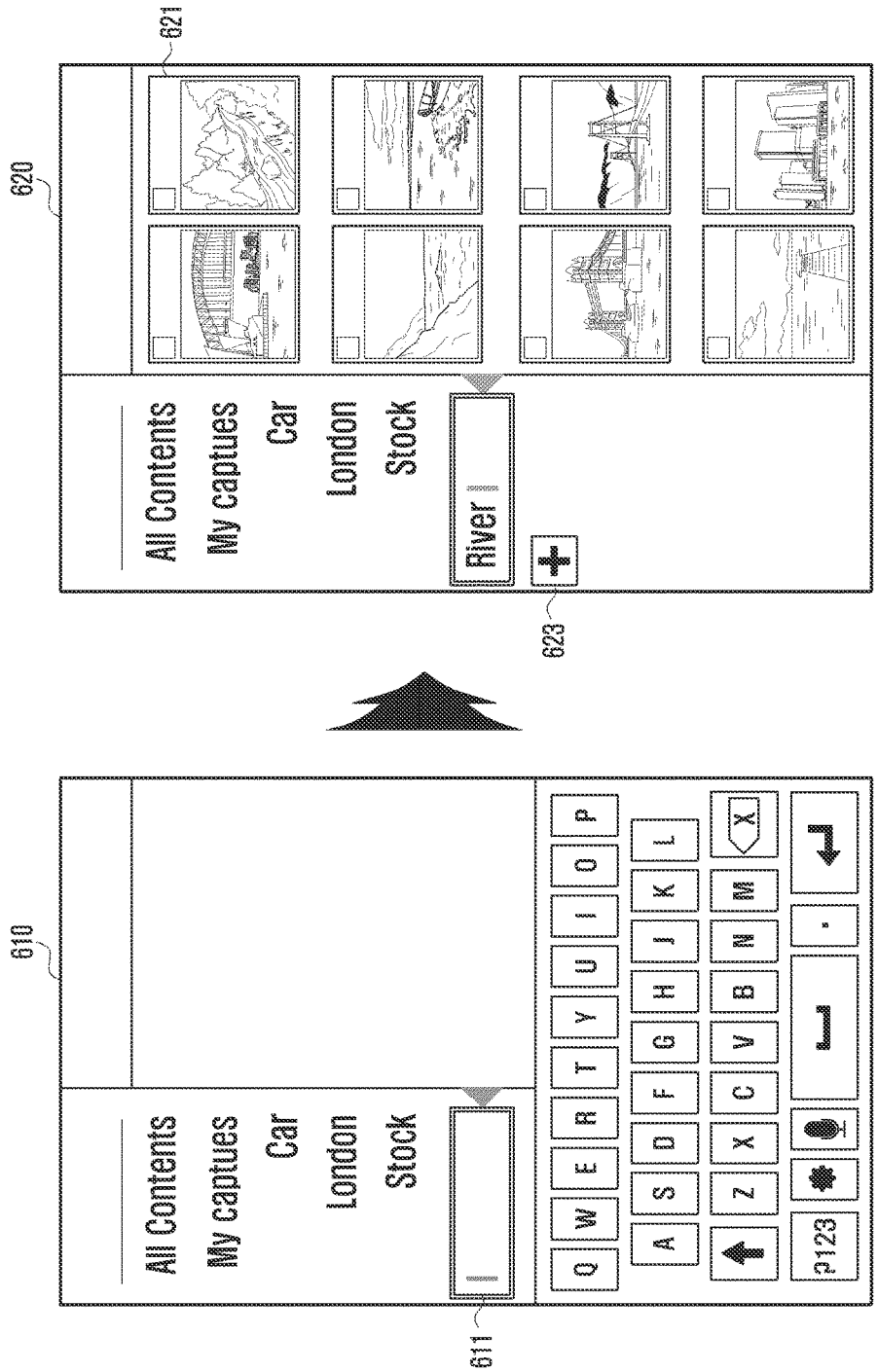
FIGS. 6A and 6B are views illustrating methods for selecting a media content and classifying the media content into a group based on a search word according to various embodiments of the present disclosure.
Figure 6B:
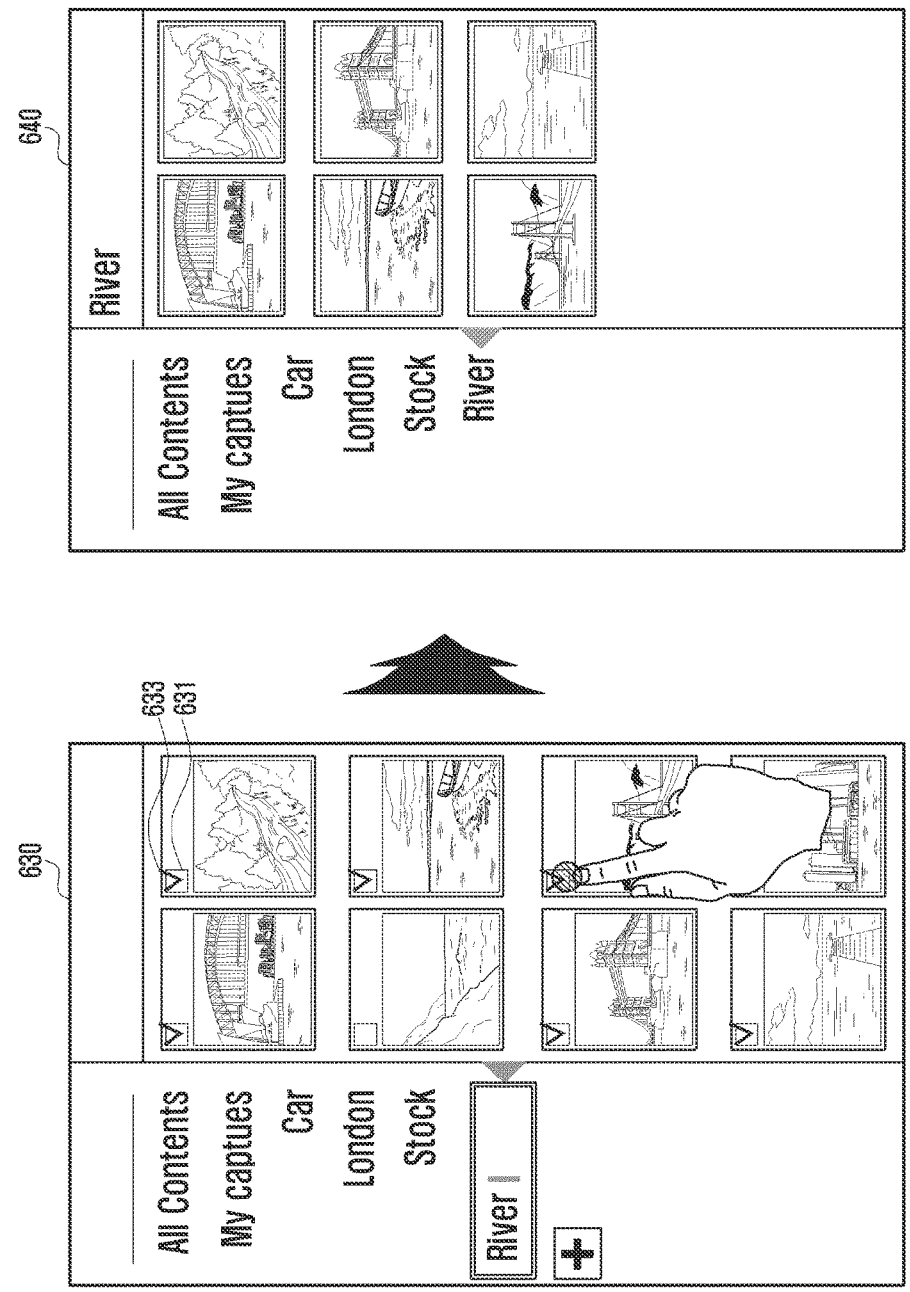

FIGS. 6A and 6B are views illustrating methods for selecting a media content and classifying the media content into a group based on a search word according to various embodiments of the present disclosure. FIGS. 6A and 6B illustrate a screen output through the display 470 of the electronic device 400.

Referring to FIG. 6A, screen 610 may be an initial screen of when a media content related application (e.g., a gallery and an album) is executed. Here, the media content related application may be an application which manages a media content stored in the electronic device 400. In screen 610, a search window 611 may be displayed and a search word may be input by a user. That is, the control module 410 can analyze a user's input through the user input device 450. Here, the search word input on the search window 611 may be a group name (e.g., a folder name and an album name) of a group to which the media content stored in the electronic device 400 moves. Further, the control module 410 can use the vocabulary analyzing module 460 to analyze the search word input on the search window 611. Screen 620 may be a screen on which a media content corresponding to a search word is displayed when the search word is input. For example, when a user inputs a search word "River", the control module 410 can sort and display a media content relating to the search word "River". The control module 410 can analyze a search word input on the search window 611, using the vocabulary analyzing module 460 and identify a media content including information (e.g., image information) relating to the search word, using the media content information managing module 430. The control module 410 can analyze the media content based on a media content stored when the electronic device 400 photographs or downloads the media content, using the media content analyzing module 420, and can detect media content information. For example, the control module 410 can identify information on a photographing location, a photographing date, etc. of the media content as well as meta data such as a person, a word, a figure, an object, a brand, a color, a sculpture, etc., using the media content analyzing module 420. Further, the control module 410 can include the identified meta data in the media content. That is, when the search word coincides with meta data information, the control module 410 can extract a media content including the meta data information as a media content relating to the search word. The control module 410 can output the media content identified by the media content information managing module 430, through the display 470. For example, the media content can be output in a thumbnail form 621 and be identified by a user. Further, when additionally performing searching while the media content is displayed, a user can use an additional search button 623. The searching performed by the additional search button 623 will be described in the detailed descriptions of FIGS. 6C and 6D.

Referring to FIG. 6B, screen 630 may be a screen of when a user selects a media content displayed on the display 470. A user can identify the media content displayed on the display 470 with the naked eyes and select only a desired media content. Each media content includes a selection input box 631, and the control module 410 can detect a user input which is input on the selection input box 631. The control module 410 can check a mark to the media content selected by the user input as indicated by reference numeral 633, thereby distinguishing the media content from other images. Screen 640 may be a screen obtained by moving the selected media contents to a specific group. For example, the control module 410 can generate a group named the search word input on the search window 611, and move, to the group, a media content selected by a user among media contents relating to the search word. Here, the control module 410 can first generate a group and then sort media contents or can first sort media contents, generate a group, and then include the media content in the group.

Figure 6D:
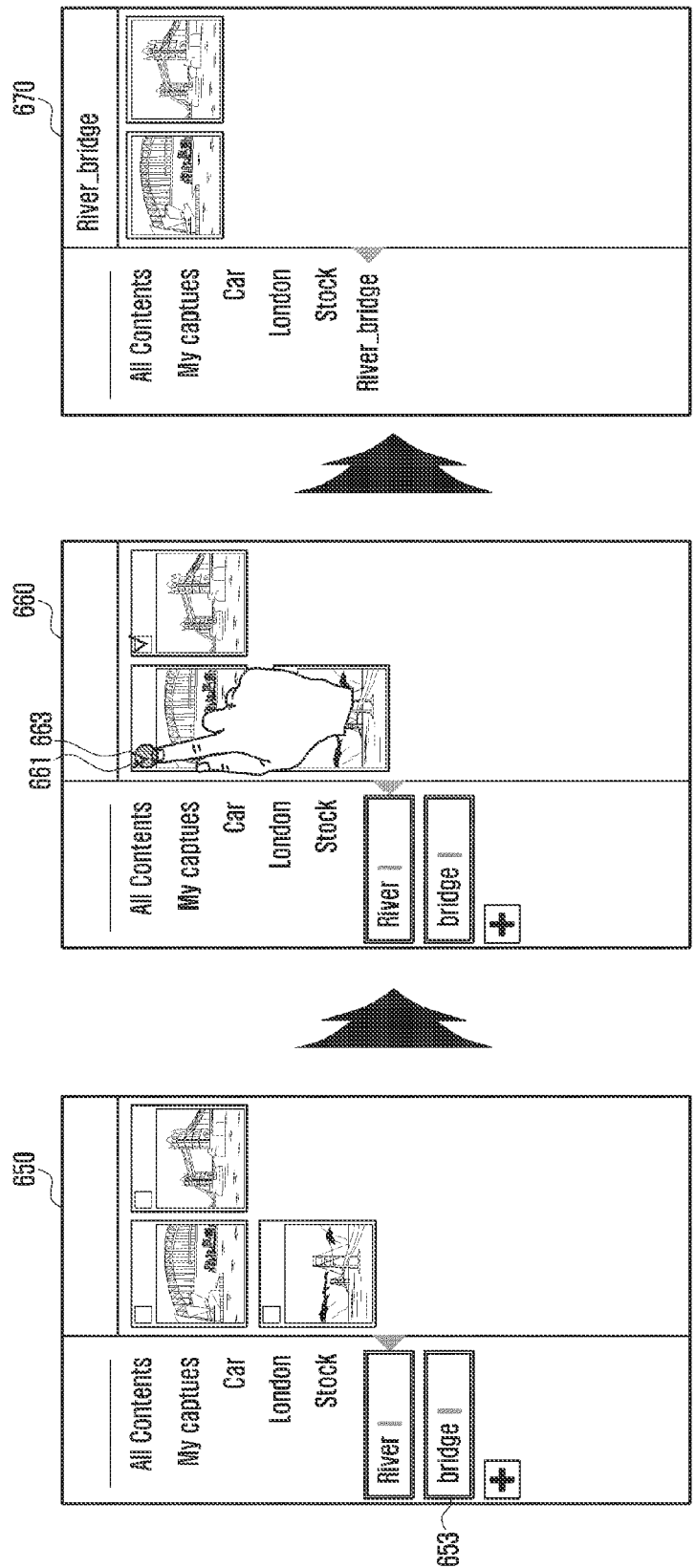

FIGS. 6C and 6D are views illustrating methods for selecting a media content and classifying the media content into a group based on a plurality of search words according to various embodiments of the present disclosure.

Referring to FIG. 6C, screen 610 may be an initial screen of when a media content related application (e.g., a gallery and an album) is executed. FIG. 6C is identical to FIG. 6A, and is attached in order to describe an operation sequence. In screen 620, the control module 410 can analyze a search word input on the search window 611 and firstly output a media content relating to the search word, in a thumbnail form 621. For example, when the word "River" is input on the search window, the control module 410 can analyze the input word "River" and extract a media content relating to the word. For example, the control module 410 can extract a media content based on the location information such as the "River", and can extract a media content including the word "River" based on the word. Further, when an input search word is a word having a hierarchical structure, the control module 410 can extract a related media content according to the hierarchical structure. Further, when a user uses the additional search button 623, the user can perform additional searching based on a firstly-output media content. When the additional search button 623 is used in screen 620, the control module 410 can display an additional search window and perform the additional searching through a search word input on the additional search window.

Referring to screen 650 in FIG. 6D, the control module 410 can analyze a search word input on an additional search window 653 and secondly output a media content relating to the search word input on the additional search window 653 among the firstly-output media content. For example, in screen 620, the control module 410 can firstly output a media content relating to the search word "River". Further, in screen 650, the control module 410 can additionally extract a media content relating to a search word "bridge" among the firstly-output media content and secondly output the extracted media content. That is, in screen 650, the control module 410 can output a media content relating to the two search words "River" and "bridge". In screen 660, the control module 410 can detect a user input for the secondly-output media content. The control module 410 can detect a user input in a selection input box 661 and check a mark to a media content selected by the user input as indicated by reference numeral 663. In screen 670, the control module 410 can generate a group named a search word input on the search window 611 and the additional search window 653 and move the selected media content to the corresponding group. For example, when the "River" is input on the search window 611 and the "bridge" is input on the additional search window 653, a folder name may be a "River _bridge". Further, the control module 410 can move, to the folder, a media content selected by a user among the media content relating to the search word.

According to various embodiments of the present disclosure, at least some of the devices (for example, modules or functions thereof) or the method (for example, operations) according to the present disclosure may be implemented by a command stored in a non-transitory computer-readable storage medium in a programming module form. When the command is executed by one or more processors, the one or more processors may perform a function corresponding to the command. The non-transitory computer-readable storage medium may be, for example, the memory 260. At least some of the programming modules may be implemented (for example, executed) by, for example, the processor. At least a part of the programming module may include, for example, a module, a program, a routine, a set of instructions and/or a process for performing one or more functions.

The non-transitory computer readable recording medium may include magnetic media such as a hard disc, a floppy disc, and a magnetic tape, optical media such as a compact disc ROM (CD-ROM) and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of sorting media content, the method comprising:
   receiving, by a search window, at least one search word;
   displaying on a screen, by at least one processor, at least one media content corresponding to the received at least one search word;
   identifying, by the at least one processor, a user's selection corresponding to the at least one media content based on the displayed at least one media content;
   determining, by a control module of the at least one processor, a group name corresponding to the at least one search word;
   grouping, by the at least one processor, the at least one media content corresponding to the user's selection; and
   sorting, by the at least one processor, the at least one media content,
   wherein the determining of the group name comprises:
   analyzing the at least one search word, and
   determining the group name based on the analyzing.

2. The method of claim 1, wherein the at least one media content comprises meta data.

3. The method of claim 2, wherein the meta data comprises at least one of object information or information on an image, which are included in the at least one media content.

4. The method of claim 1, wherein the at least one search word is analyzed and searched for morphemes.

5. The method of claim 1, wherein the at least one search word comprises at least one of a hypernym corresponding to the at least one search word or a hyponym corresponding to the at least one search word.

6. The method of claim 1, wherein the displaying of the at least one media content comprises:
   identifying meta data based on the at least one search word; and
   displaying the at least one media content based on the identified meta data.

7. The method of claim 1, wherein the displaying of the at least one media content comprises displaying the at least one media content on a display.

8. The method of claim 7, wherein the displaying of the at least one media content further comprises displaying the at least one media content in a thumbnail form.

9. The method of claim 7, wherein the displaying of the at least one media content further comprises providing a user interface (UI) for receiving an input of a user's selection for the at least one media content.

10. An electronic device comprising:
   a display configured to display at least one media content;
   at least one processor,
   wherein the at least one processor is configured to control to:
   receive, by a search window, at least one search word,
   display, on a screen, at least one media content corresponding to the received at least one search word,
   identify a user's selection corresponding to the at least one media content based on the displayed at least one media content,
   determine a group name corresponding to the at least one search word,
   group the at least one media content corresponding to the user's selection, and
   sort the selected media content,
   wherein, to determine the group name, the at least one processor is further configured to control to:
   analyze the at least one search word, and
   determine the group name based on the analyzed at least one search word.

11. The electronic device of claim 10, wherein the at least one media content comprises meta data corresponding to the at least one media content.

12. The electronic device of claim 11, wherein the meta data comprises information on an object and an image generated based on the media content.

13. The electronic device of claim 10,
   wherein the at least one search word is analyzed and searched for morphemes, and
   wherein the at least one search word comprises at least one of a hypernym corresponding to the at least one search word or a hyponym corresponding to the at least one search word.

14. The electronic device of claim 10, wherein the at least one processor is further configured to:
   execute an application related to the media content,
   control the application to display a search window user interface (UI) through which the at least one search word is received, and
   display a selection input box UI configured to select a selected media content from the displayed at least one media content.

15. The electronic device of claim 10, wherein the at least one processor is further configured to:
   identify meta data based on the at least one search word, and
   display the at least one media content based on the meta data.

16. The electronic device of claim 10, wherein the display is further configured to display the at least one media content in a thumbnail form.

17. The electronic device of claim 10, wherein the at least one processor is further configured to:
   identify whether a user input is performed for the displayed at least one media content, and
   identify the user's selection based on the user input.

18. The electronic device of claim 10, wherein the at least one processor is further configured to generate a group, a group name of the group being determined based on the received at least one search word.

19. A non-transitory computer-readable recording medium for configuring at least one processor to perform a method of sorting media content in a computer, the method comprising:
   receiving, by a search window, at least one search word;
   displaying on a screen, by at least one processor, at least one media content corresponding to the received at least one search word;
   identifying, by the at least one processor, a user's selection corresponding to the at least one media content based on the displayed at least one media content;
   determining, by a control module of the at least one processor, a group name corresponding to the at least one search word;

grouping, by the at least one processor, the at least one media content corresponding to the user's selection; and sorting, by the at least one processor, the at least one media content, wherein the determining of the group name comprises:
analyzing the at least one search word, and
determining the group name based on the analyzing.

\* \* \* \* \*